United States Patent
van der Made et al.

(10) Patent No.: US 11,157,798 B2
(45) Date of Patent: Oct. 26, 2021

(54) INTELLIGENT AUTONOMOUS FEATURE EXTRACTION SYSTEM USING TWO HARDWARE SPIKING NEUTRAL NETWORKS WITH SPIKE TIMING DEPENDENT PLASTICITY

(71) Applicant: Brainchip, Inc., Aliso Viejo, CA (US)

(72) Inventors: Peter A J van der Made, Aliso Viejo, CA (US); Mouna Elkhatib, Irvine, CA (US); Nicolas Yvan Oros, Irvine, CA (US)

(73) Assignee: BrainChip, Inc., Aliso Viejo, CA (US)

( * ) Notice: Subject to any disclaimer, the term of this patent is extended or adjusted under 35 U.S.C. 154(b) by 646 days.

(21) Appl. No.: 15/431,606

(22) Filed: Feb. 13, 2017

(65) Prior Publication Data
US 2017/0236051 A1     Aug. 17, 2017

Related U.S. Application Data

(60) Provisional application No. 62/294,916, filed on Feb. 12, 2016.

(51) Int. Cl.
G06N 3/04     (2006.01)
G06N 3/08     (2006.01)

(52) U.S. Cl.
CPC ........... *G06N 3/049* (2013.01); *G06N 3/0454* (2013.01); *G06N 3/088* (2013.01)

(58) Field of Classification Search
CPC ........ G06N 3/049; G06N 3/0454; G06N 3/08; G06N 3/088
See application file for complete search history.

(56) References Cited

U.S. PATENT DOCUMENTS 5,063,601 A     11/1991 Hayduk
5,659,666 A     8/1997 Thaler
(Continued)

FOREIGN PATENT DOCUMENTS

WO     WO 2016/048743 A1     3/2016
WO     WO 2017/003491 A1     1/2017

OTHER PUBLICATIONS

Querlioz et al., "Bioinspired networks with nanoscale memristive devices that combine the unsupervised and supervised learning approaches", 2012 (Year: 2012).*
(Continued)

*Primary Examiner* — Li B. Zhen
*Assistant Examiner* — Selene A. Haedi
(74) *Attorney, Agent, or Firm* — Sterne, Kessler, Goldstein & Fox P.L.L.C.

(57) ABSTRACT

Embodiments of the present invention provide an artificial neural network system for feature pattern extraction and output labeling. The system comprises a first spiking neural network and a second spiking neural network. The first spiking neural network is configured to autonomously learn complex, temporally overlapping features arising in an input pattern stream. Competitive learning is implemented as spike timing dependent plasticity with lateral inhibition in the first spiking neural network. The second spiking neural network is connected with the first spiking neural network through dynamic synapses, and is trained to interpret and label the output data of the first spiking neural network. Additionally, the labeled output of the second spiking neural network is transmitted to a computing device, such as a central processing unit for post processing.

21 Claims, 6 Drawing Sheets

(56) References Cited

U.S. PATENT DOCUMENTS

| | | | |
|---|---|---|---|
| 5,680,481 | A | 10/1997 | Prasad et al. |
| 6,233,365 | B1 | 5/2001 | Teruhiko |
| 6,247,002 | B1 | 6/2001 | Steels |
| 7,933,451 | B2 | 4/2011 | Kloer |
| 8,045,418 | B2 | 10/2011 | Suzuki |
| 8,250,011 | B2 | 8/2012 | Van Der Made |
| 8,346,692 | B2 | 1/2013 | Rouat et al. |
| 9,129,221 | B2 | 9/2015 | Piekniewski et al. |
| 9,208,432 | B2 | 12/2015 | Buibas et al. |
| 9,224,090 | B2 | 12/2015 | Piekniewski et al. |
| 9,239,985 | B2 | 1/2016 | Piekniewski |
| 2010/0081958 | A1 | 4/2010 | She |
| 2013/0297539 | A1 | 11/2013 | Piekniewski |
| 2014/0081895 | A1 | 3/2014 | Coenen et al. |
| 2014/0122398 | A1 | 5/2014 | Richert |
| 2014/0365414 | A1* | 12/2014 | Richert ............ G06N 3/08 706/16 |
| 2015/0063575 | A1 | 3/2015 | Tan |
| 2015/0066820 | A1 | 3/2015 | Kapur et al. |
| 2015/0204559 | A1 | 7/2015 | Hoffberg |
| 2015/0269482 | A1* | 9/2015 | Annapureddy ...... G06N 3/049 706/25 |
| 2015/0278641 | A1 | 10/2015 | Agrawal et al. |
| 2015/0278680 | A1* | 10/2015 | Annapureddy ..... G06N 3/0454 706/25 |
| 2015/0379397 | A1 | 12/2015 | van der Made et al. |
| 2016/0086076 | A1* | 3/2016 | Alvarez-Icaza Rivera ............... G06N 3/06 706/25 |
| 2016/0210552 | A1 | 7/2016 | Kasabov et al. |
| 2016/0267359 | A1 | 9/2016 | Gan et al. |
| 2017/0024644 | A1 | 1/2017 | van der Made et al. |
| 2017/0024877 | A1 | 1/2017 | Versace et al. |
| 2017/0236027 | A1 | 8/2017 | van der Made et al. |

OTHER PUBLICATIONS

Chartier, "Autonomous Perceptual Feature Extraction in a Topology-Constrained Architecture." Proceedings of the 30th Annual Conference of the Cognitive Science, Society University of Ottawa p. 1868-1873 Jul. 23-26, 2008.

Bichler, "Extraction of Temporally Correlated Features from Dynamic Vision Sensors with Spike-Timing-Dependent Plasticity," Neural Networks 32: 339-348 Aug. 1, 2012.

Várkonyi-Koczy, "Intelligent Autonomous Primary 3D Feature extraction in Vehicle System Dynamics Analysis: Theory and Application," Acta Polytechnica Hungarica 5(1): 5-29, Jan. 1, 2008.

Qiao et al., "A reconfigurable on-line learning spiking neuromorphic processor comprising 256 neurons and 128K synapses," Frontiers in Neuroscience, www.frontiersin.org, Apr. 2015, vol. 9, Article 141, 2015, 17 pages.

Wolff, "Lipreading by neural networks: Visual preprocessing, learning and sensory integration," Advances in Neural Information Processing Systems 6: 1027-1034, Jan. 1, 1994.

Tolson, "Machine Learning in the area of image analysis and pattern recognition," Advanced Undergraduate Project, Spring 2001, 35 pages.

Wu, "Processing visual stimuli using hierarchical spiking neural networks," Neurocomputing 71(10): 2055-2068, Jun. 1, 2008.

Girau, "FPGA implementation of an integrate-and-fire LEGION model for image segmentation," European Symposium on Artificial Neural Networks Bruges (Belgium), Apr. 26, 2006, 6 pages.

Rowcliffe, "Clustering within Integrate-and-Fire Neurons for Image Segmentation," Artificial Neural Networks—ICANN 2002 Lecture Notes in Computer Science 245:69-74, Aug. 28, 2002.

Non-Final Office Action directed to U.S. Appl. No. 15/435,264, dated Jan. 2, 2019; 7 pages.

Final Office Action directed to U.S. Appl. No. 15/435,264, dated Dec. 31, 2019; 20 pages.

Non-Final Office Action directed to U.S. Appl. No. 15/435,264, dated Jun. 17, 2019; 19 pages.

Non-Final Office Action directed to U.S. Appl. No. 15/435,264, dated Aug. 13, 2020; 16 pages.

Non-Final Office Action directed to U.S. Appl. No. 15/435,264, dated May 19, 2021; 21 pages.

Non-Final Office Action directed to U.S. Appl. No. 15/428,073, dated Sep. 5, 2019; 28 pages.

Final Office Action directed to U.S. Appl. No. 15/428,073, dated Mar. 24, 2020; 32 pages.

Non-Final Office Action directed to U.S. Appl. No. 15/428,073, dated Mar. 15, 2021; 30 pages.

Querlioz, Damien, Olivier Bidder, and Christian Gamrat, "Simulation of a memristor-based spiking neural network immune to device variations," 2011 International Joint Conference on Neural Networks. IEEE, 2011 (Year: 2011), 7 pages.

Arthur, John V., et al. "Building block of a programmable neuromorphic substrate: A digital neurosynaptic core," 2012 international joint conference on Neural networks (IJCNN). IEEE, 2012, (Year: 2012), 8 pages.

Blessinger, Michael A., et al. "Performance of focal plane arrays for the photon counting arrays (PCAR) program," Infrared Technology and Applications XXXIII, vol. 6542. International Society for Optics and Photonics, 2007, (Year: 2007), 11 pages.

* cited by examiner

INTELLIGENT AUTONOMOUS FEATURE EXTRACTION SYSTEM USING TWO HARDWARE SPIKING NEUTRAL NETWORKS WITH SPIKE TIMING DEPENDENT PLASTICITY

CROSS REFERENCE TO RELATED APPLICATION

This application claims the benefit of U.S. Provisional Patent Application No. 62/294,916, filed 12 Feb. 2016, the disclosure of which is hereby incorporated by reference in its entirety.

FIELD OF THE INVENTION

The present invention relates to an automated pattern recognition using neural networks and more particularly to an autonomous feature extraction system using spiking neural networks.

BACKGROUND

The goal of automated feature extraction is to design a system that approaches the human ability to recognize sensory features, objects and people, by means of autonomous extraction of patterns from visual, audio, olfactory and other sensory data streams. Detecting patterns in still and streaming images, or matching sound patterns in streaming audio are valuable pattern recognition tasks, useful in safety and security monitoring systems, unmanned vehicles, robotic vision, acoustic and behavior recognition. Accurate detection of objects is a challenging task due to lighting changes, occlusions, noise and convoluted backgrounds or background noise. Principal approaches use either template matching with hand-designed features or trained deep convolutional networks of simple artificial neurons and combinations thereof. Deep convolutional neural networks learn by means of a technique called back-propagation, in which errors between expected output values and actual output values are propagated back to the network by means of an algorithm that slowly updates synaptic weights with the intent to minimize errors. However, these methods are not flexible when dealing with previously unknown patterns or in the case of rapidly changing or flexible feature templates. The field of neural networks is aimed at developing intelligent machines that are based on mechanisms which are assumed to be related to brain function.

First Generation artificial neural networks were based on the simplified neural model of Warren S. McCulloch and Walter Pitts. The McCulloch-Pitts neuron was presented in their 1943 paper "A Logical Calculus of Ideas Immanent in Nervous Activity". The McCulloch-Pitts neuron is also known as a Threshold Gate, which takes a plenitude of Boolean inputs and returns a single Boolean output. The output is logic '1' when the inputs are greater or equal to a defined threshold value. The transfer function is a logic AND, OR or NOT function. First generation neural networks used the McCulloch-Pitts neuron as the basic computation unit in a single layer without feedback.

Second generation artificial neural networks are based on McCulloch-Pitts neurons modified to use a sigmoid activation functions and a continuous set of possible output values. In 1957 the 'Perceptron', also known as the MARK1 was presented at the Cornell Aeronautical Laboratory, in a paper by Frank Rosenblatt. The perceptron is a single-layer, feed-forward artificial neural network.

Third generation artificial neural networks are based on spiking neurons, whereby the synaptic strength is expressed as a value. Such networks are trained by manually or programmatically adjusting this value. Most neural network models are based on the following three assumptions. Firstly, the efficacy of a synapse in generating a synaptic potential is assumed to be static for a resulting action potential in neurons. The efficacy of a synapse is essentially a constant that is derived from training that is performed independently from the neural network by indirect means. Certain models modify this assumption by allowing a slow variation over a period of processing many variables. In the second assumption, each sending neuron provides the same signal to all other neurons to which it is connected by some means. Thirdly, the network is trained by direct or indirect manual means. Most networks are feed-forward networks with no feedback.

However, there is a need for an artificial neural network which can implement rapid real-time machine learning and can autonomously extract features and label them as an output.

Detecting nonspecific items in images, video streams and audio streams is one of the most valuable pattern recognition tasks that can be deployed in surveillance, industrial safety, medical image classification, person identification, access control and other areas.

SUMMARY

In a first aspect of the invention, a system for autonomous feature extraction is provided. The system comprising: an arrangement of a first artificial neural network and a second artificial neural network, said first artificial neural network autonomously learns to recognize a repeating pattern in an input stream and the second artificial neural network is trained to interpret and label the repeating pattern recognized by the first artificial neural network. The first artificial neural network autonomously learns any repeating pattern within 3 to 7 repetitions through spike timing dependent plasticity (STDP) and lateral inhibition. Under the STDP learning, the characteristics of the synapses are modified, depending on the timing of neural input spikes to neural output spikes. For an instance, if an input spike to a neuron tends, on average, to occur immediately before that neuron's output spike, then that particular input is made somewhat stronger. If an input spike tends, on average, to occur immediately after an output spike, then that particular input is made somewhat weaker. Lateral inhibition refers to the capacity of excited neurons to diminish the activity of their neighbors. In other words, lateral inhibition occurs when the activity of one cell suppresses the activity of a nearby cell. Accordingly, only the neurons, which are most stimulated and least inhibited, respond. The first artificial neural network and the second artificial neural network are single layered or multilayered spiking neural networks. The labeling of the repeating pattern by the second artificial neural network is carried out by mapping learned features into output labels within a predetermined knowledge domain. The system further comprises an optional input unit having a network of artificial sensory neurons connected to the first artificial neural network, said input unit converts the data captured in the form of an image, characters or values by a sensor array into temporally and spatially distributed spikes. The sensor array comprises a plurality of sensors for capturing data of interest and generating the input stream. The first artificial neural network and the second artificial neural network comprises a plurality of digital neuron circuits interconnected by a plurality of synapse circuits. The first artificial neural network autonomously learns by means of STDP and lateral inhibition to create the predetermined knowledge domain comprising of a plurality of weights representing the learned features in the input stream. The second artificial neural network is configured to function in a supervised manner and is trained to produce input/output maps within the predetermined knowledge domain. The second artificial neural network comprises a monitoring means to identify outputs that meet some predefined criteria. The second artificial neural network transmits the output labels to a computing device, such as a central processing unit, for post processing. The plurality of sensors are analog or digital sensors, such as vision sensors, digital microphones, tactile pressure sensors, chemical sensors and the sensors that are outside of human perception such as infrared, radar or ultrasound.

In a second aspect of the present invention, a method for autonomously extracting features in an artificial neural network system is provided. The method comprising: feeding an input pattern stream from a sensor to a first artificial neural network; learning, autonomously, by the first artificial neural network to recognize repeating patterns in the input stream and subsequently perform feature extraction; sending spikes representing recognized pattern to a second artificial neural network from the first artificial neural network; labeling the recognized spike patterns, representing features learned by the first neural network and received from the first artificial neural network, by the second artificial neural network; and sending labeled data representing the recognized patterns to a computing device for post processing. The first artificial neural network and the second artificial neural network comprises a plurality of digital neuron circuits interconnected by a plurality of synapse circuits. The first artificial neural network and the second artificial neural network comprises either a single layer or multilayer of digital neuron circuits. The first artificial neural network autonomously learns by means of STDP and lateral inhibition to create the predetermined knowledge domain comprising of a plurality of weights representing the learned features in the input stream. The second artificial neural network is configured to function in a supervised manner and is trained to produce input/output maps within the predetermined knowledge domain. The second artificial neural network comprises a monitoring means to identify outputs that meet some predefined criteria. The second artificial neural network transmits the output labels to a computing device, such as a central processing unit, for post processing.

BRIEF DESCRIPTION OF DRAWINGS

The preferred embodiment of the invention will hereinafter be described in conjunction with the appended drawings provided to illustrate and not to limit the scope of the invention, wherein like designation denotes like element and in which.

DETAILED DESCRIPTION

In the following detailed description of embodiments of the invention, numerous specific details are set forth in order to provide a thorough understanding of the embodiments of the invention. However, it will be obvious to a person skilled in art that the embodiments of the invention may be practiced with or without these specific details. In other instances, well known methods, procedures and components have not been described in details, so as not to unnecessarily obscure aspects of the embodiments of the invention.

Furthermore, it will be clear that the invention is not limited to these embodiments only. Numerous modifications, changes, variations, substitutions and equivalents will be apparent to those skilled in the art, without parting from the spirit and scope of the invention.

In an embodiment of the present invention, a system for autonomous feature extraction using two or more artificial neural networks implemented in a digital hardware is provided. The system comprises a first spiking neural network and a second spiking neural network arranged in a hierarchical manner and is configured to process the information. The system is configured to receive and process information from a variety of sources in a variety of forms, such as an image source, a video source from an image sensor or from a source that is outside human perception such as infrared, radar or ultrasound images. Each of the first spiking neural network and the second spiking neural network comprises a plurality of digital artificial neurons connected to each other through digital synapses. The first spiking neural network autonomously learns to recognize patterns in the input streams and the second spiking neural network performs data labeling for pattern recognized by the first spiking neural network.

The information transacted within the system is expressed as spikes, which are defined as short pulses of electrical energy that have precise timing. Autonomous learning by the first spiking neural network is performed through spike dependent time plasticity process, and it occurs when a synaptic strength value within the system is increased or decreased, as a result of the temporal difference of an input spike temporally related to a soma feedback output spike. The labeled data from the second spiking neural network is then made available as an output to a microprocessor or a computer system.

Figure 1:
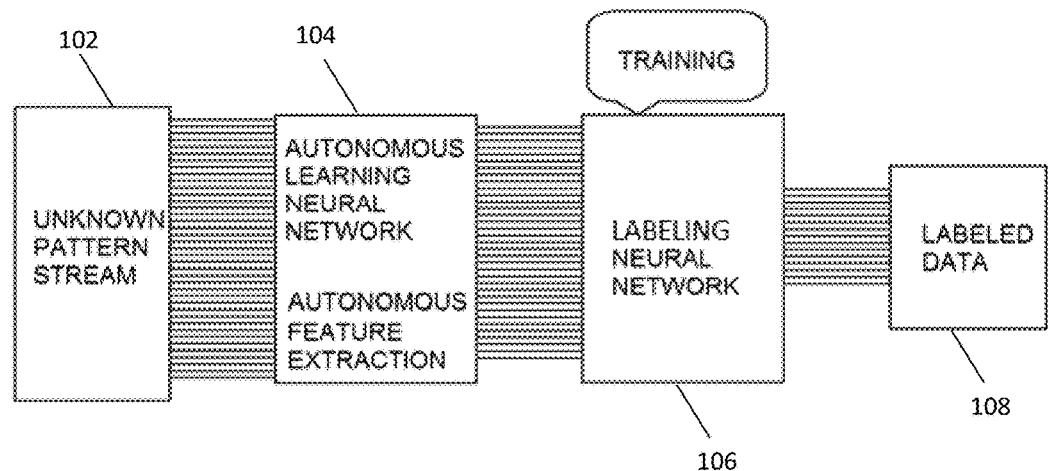
FIG. 1 illustrates a schematic representation of an autonomous learning neural network and an output labeling system, in accordance with an embodiment of the present invention.

FIG. 1 illustrates a schematic representation of an autonomous learning neural network and output labeling system, in accordance with an embodiment of the present invention. The system comprises an autonomous learning neural network and an output labeling neural network. The information transacted within the system is expressed as spikes. An unknown pattern stream 102 is fed into the system through a sensory neuron or an input neuron. The unknown input pattern streams can be an image stream or a video stream or any known stream beyond the perception of a human being. The unknown pattern stream 102 is the output of a sensor or a detector which is used to sense or detect a data. The unknown pattern stream can be in the form of a data, a character, a pattern, a sensor data, a visual data stream or a data from detectors such as an infrared, ultrasound or an x-ray image. The data of the unknown pattern streams are converted into spikes by a plurality of sensory neurons and are fed into the autonomous learning neural network 104. The autonomous learning neural network 104 autonomously learns to recognize any repeating patterns in the input streams and subsequently performs autonomous feature extraction. The autonomous learning neural network uses synaptic time dependent plasticity and later inhibition for creating a knowledge domain comprised of a plurality of weights representing learned features arising in the unknown input pattern streams.

The labeling neural network 106 receives temporally and spatially distributed spikes from the autonomous learning neural network 104 that represent learned features. The labeling neural network 106 comprises a spiking neural network that can be trained in a supervised manner to map learned features into output labels. The labeled data 108 from the labeling neural network 106 can then be used by a microcontroller or a computer system.

Figure 2:
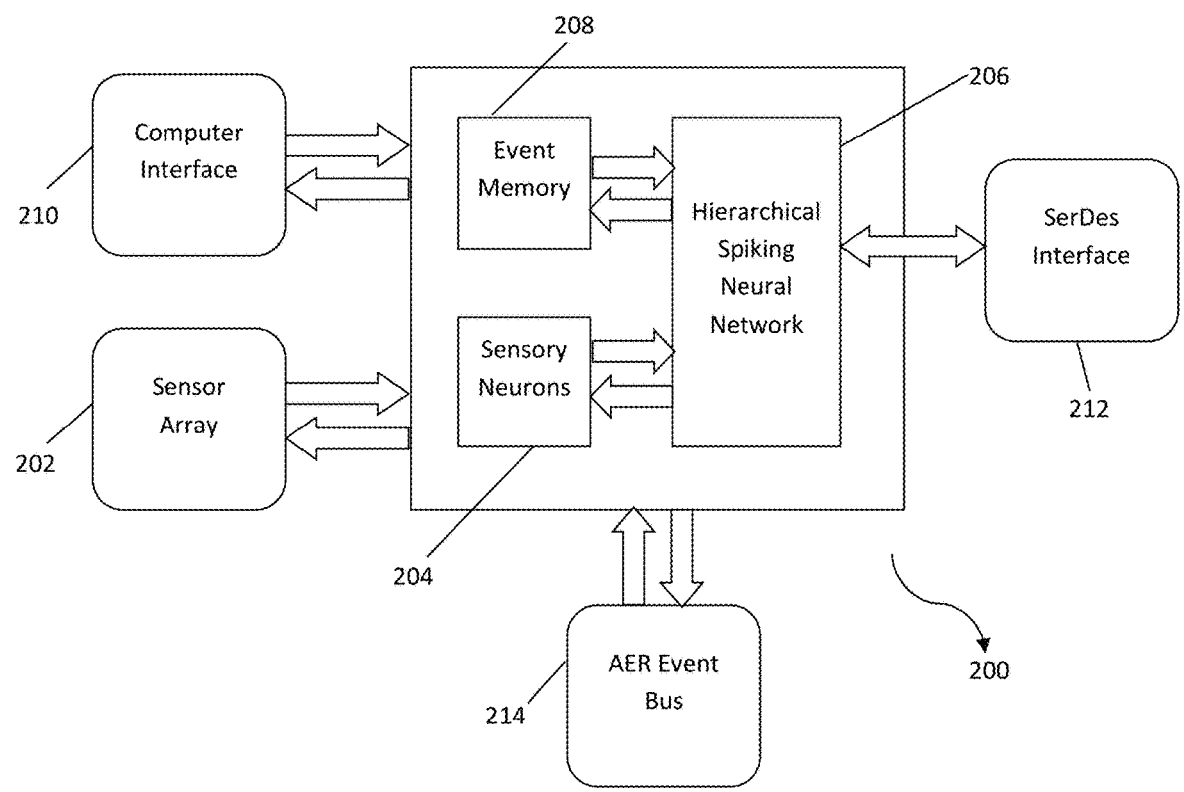
FIG. 2 illustrates an autonomous feature extraction device, in accordance with an embodiment of the present invention.

FIG. 2 illustrates an autonomous feature extraction device, in accordance with an embodiment of the present invention. The autonomous feature extraction device comprises a hierarchical spiking neural network 206 connected to a plurality of sensory neurons 204. The hierarchical spiking neural network 206 comprises two or more spiking neural networks configured to perform the functions of autonomous learning, feature extraction and labeling the learned features in a hierarchical manner. The sensory neuron 204 receives inputs from one or more sensors present in the sensor array 202. The sensor may include and is not limited to analog sensors or digital sensors. The events associated with the hierarchical spiking neural network 206 are stored in an event memory 208. The events may include the recognized pattern data and the labeled data. The event memory is externally accessible by a computing device such as a CPU or a microcontroller and an associated computer program.

The event memory 208 is connected to a computer interface 210 for transmitting the output of the autonomous feature extraction device 200 to a computing device, such as a CPU or a microprocessor. An address event representation (AER) event bus 214 is provided in the autonomous feature extraction device 200 for generating events that are represented on the AER event bus and thus enables multiple feature extraction neural networks to communicate with the computing device for expanding the width and the depth of the network. The AER event bus is also used to connect spiking peripheral devices such as an artificial cochlear or a dynamic vision sensor. A Serializer/Deserializer (SerDes) interface 212 communicates with the autonomous feature extraction device 200 to provide data transmission over a single/differential line in order to minimize the number of Input/Output pins and interconnects.

Figure 3:
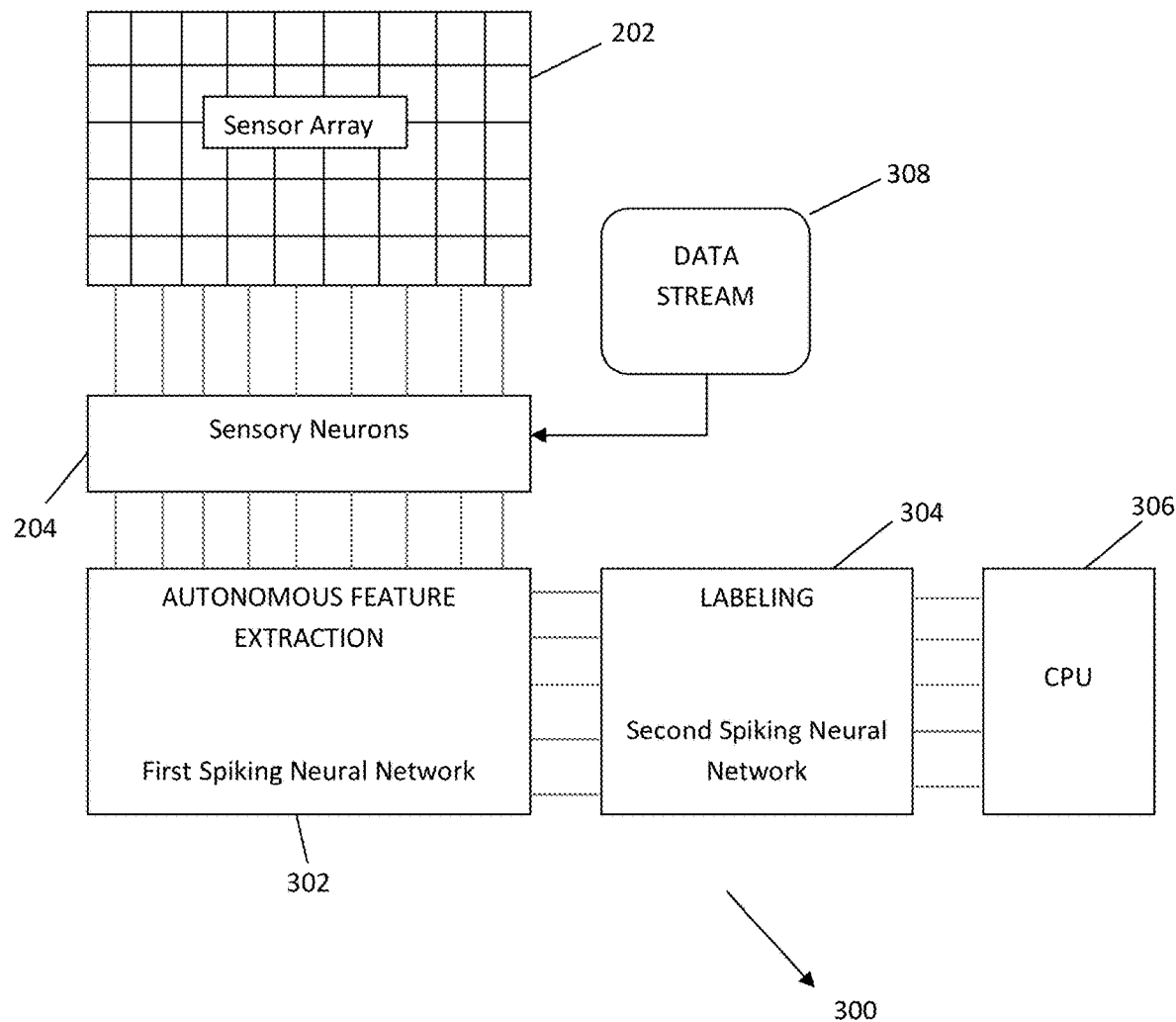
FIG. 3 illustrates an architecture of autonomous feature extraction device showing a first spiking neural network and a second spiking neural network, in accordance with an embodiment of the present invention.

FIG. 3 illustrates an architecture of autonomous feature extraction device showing a first spiking neural network and a second spiking neural network, in accordance with an embodiment of the present invention. The sensor array 202 having one or more sensors or detectors is connected to the network of sensory neurons 204. Alternatively, an external input data stream 308 is fed into the network of sensory neurons 204. The sensory neurons convert the sensory data or the external data stream into temporally and spatially distributed spikes. The hierarchical neuron network 206 of the autonomous feature extraction device comprises a first spiking neural network 302 and a second spiking neural network 304. The first spiking neural network receives the external input data stream 308 from the sensor array 202 through the network of sensory neurons 204. The sensory neurons 204 convert the character or data or values into spikes representing the corresponding value. The first spiking neural network 302 extracts the feature from the input data stream 308 and sends the extracted features to the second spiking neural network 304. The second spiking neural network 304 identifies the output (i.e. the extracted features) from the first spiking neural network 302 and labels the extracted features. The labeled data is then transferred to the control and processing unit 306 of a computer system. Therefore, the first spiking neural network 302 recognizes the features in an input pattern stream or input spikes while the second spiking neural network 304 labels the recognized features.

The first spiking artificial neural network 302 is configured to learn autonomously by applying the input data stream 308, by means of a learning method known as synaptic time dependent plasticity and lateral inhibition. Thereby, a knowledge domain is created that comprises of a plurality of weights representing learned features arising in the input data stream 308.

The sensor array 202 provides a defined, but unlabeled input pattern stream that is fed to the first spiking neural network 302 of the system 300. Examples of sensors include and are not limited to analog or digital sensors, such as vision sensors, digital microphones, tactile pressure sensors, chemical sensors and other types of sensors or data sources. The plurality of digital artificial spiking neurons of the first spiking neural network 302 is connected by means of the dynamic sensory neurons 204 to the sensor array 202. In an embodiment, the sensor 202 may be connected directly to the first spiking neural network 302, wherein the sensor array 202 provides a stream of temporal and spatially distributed spikes, comprising of defined but unlabeled pattern streams.

If the input stream is a data stream 308, the network of artificial sensory neurons 204 converts the input streams into digital spikes. Hence, temporal and spatial spike patterns are generated first, that represent values in the input data stream 308. The artificial sensory neurons 204 fire spikes at different temporal distributions depending on the data that they received.

The temporally and spatially distributed output spikes of the artificial sensory neurons 204 are then forwarded as an input to the first spiking neural network 302 that performs the autonomous feature extraction function. Autonomous feature extraction is also known as unsupervised feature learning. The first spiking neural network 302 learns the features in the input data stream 308 that characterizes an applied dataset through a function known as spike timing dependent plasticity (commonly abbreviated as STDP).

STDP modifies the characteristics of the synapses depending on the timing of neural input spikes to neural output spikes. The first spiking neural network utilizes lateral inhibition during autonomous learning. In lateral inhibition, the first neuron, to respond to a specific pattern, inhibits other neurons within the same lateral layer and said inhibition enables these neurons to learn different features. In the present embodiment, the applied dataset may contain the features of handwritten characters. Thus, the autonomous feature extraction module, which is the first neural network 302, learns the features of letters, digits, patterns, and sequences of data. It may be obvious to a person skilled in the art, that the applied dataset may contain other features, such as financial data, analogous and digital sensor information, etc. without departing from the meaning and scope of the present invention. Lastly, the STDP learning rule may be switched off when all the desired features have been learned.

After the first spiking neural network 302 have learned and recognized the features in the input pattern stream 308, the first spiking neural network 302 feeds temporally and spatially distributed spikes to the second spiking neural network 304. The second spiking neural network 304 comprises a spiking neural network that can be trained in a supervised manner to map the learned features into output labels. For instance, in the handwritten characters, the output labels are indicative of letters and digits that the first spiking neural network 302 has learned to recognize. Thereafter, the output labels can be transmitted to an external device like a central processing unit (CPU) 306 for post processing.

The identification of output spikes from the first spiking neural network 302 is performed by a monitoring means, which is the second spiking neural network 304. The second spiking neural network 304 is trained to identify outputs that meet some predefined criteria. The second spiking neural network 304 is further trained to produce input-output maps within a predetermined knowledge domain, wherein the identification of outputs is indicative of production of useful information by the autonomous feature extraction device. The outputs of the first spiking artificial neural network 302 are identified by the second spiking neural network 304 that represents labeled data.

The autonomous feature extraction system 300 implements the neural networks for pattern features extraction. Feature extraction is a process of mapping original features (measurements) into fewer features which include main information of a data structure. Unsupervised methods are applied in feature extraction when a target class of input patterns is unknown. The first spiking neural network 302 autonomously learns to recognize the repeating pattern in one or more input data streams and thus performs autonomous feature extraction, and the second spiking neural network 304 performs data labeling for pattern recognized by the first spiking neural network 302. The labeled data may then be made available as an output to a microprocessor or a computer system, as required.

In an embodiment of the present invention, the first spiking neural network 302 and the second spiking neural network 304 may be multi-layer or single layer neural network for processing of information.

Figure 4:
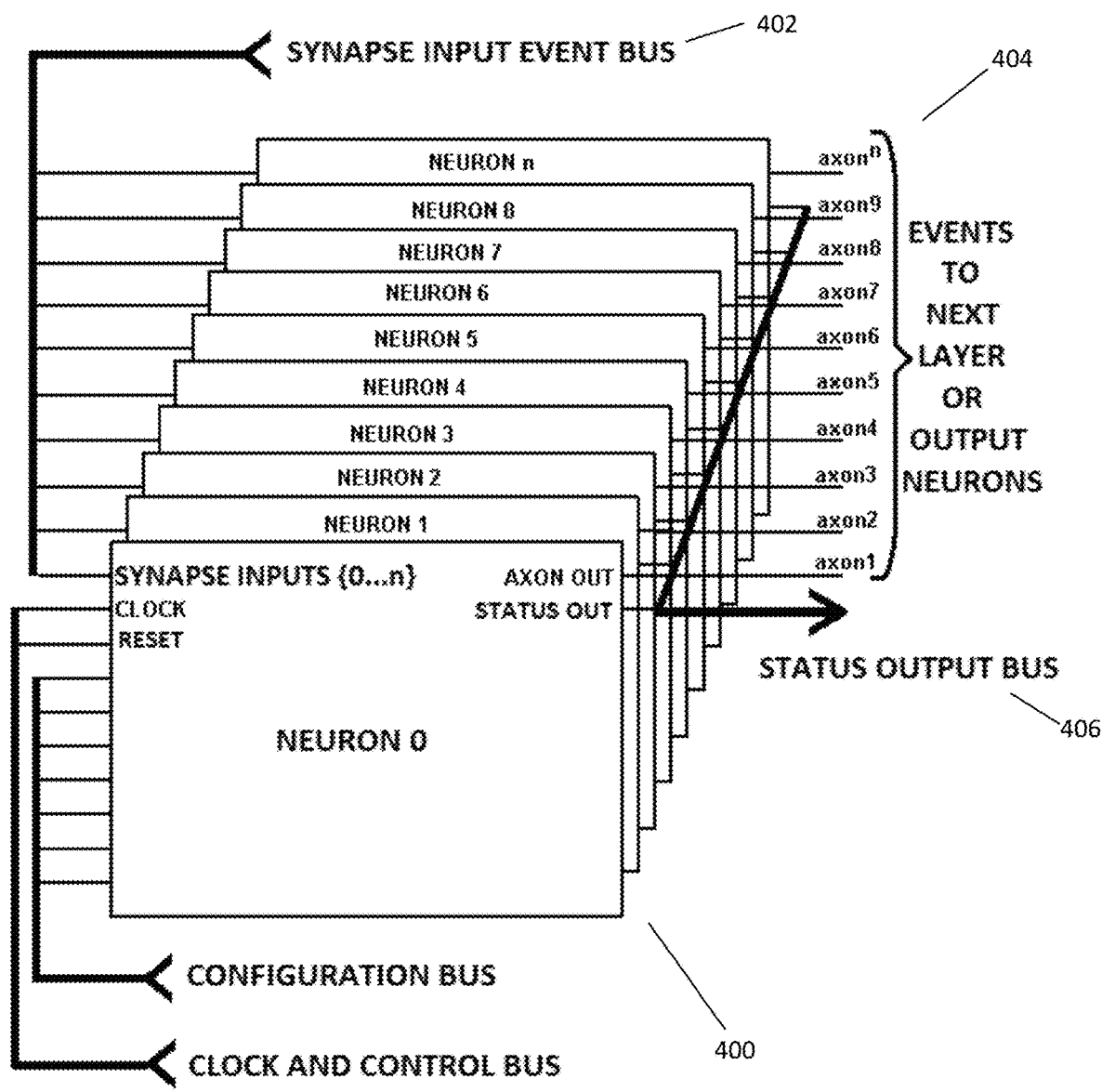
FIG. 4 illustrates an artificial neuron array used in the first spiking neural network and the second spiking neural network, in accordance with an embodiment of the present invention.

FIG. 4 illustrates an artificial neuron array used in the first spiking neural network and the second spiking neural network, in accordance with an embodiment of the present invention. Each of the first spiking neural network and the second spiking neural network comprises of a plurality of artificial neurons forming an artificial neuron array 400. The digital neurons present in the array 400 are externally connected where each synapse input and soma output is accessible. The digital neurons {0 . . . n} are connected to each other via synapses and receive a corresponding synaptic input through a number of synaptic circuits via a synapse input event bus 402. The output of the plurality of synapses is integrated by a dendrite circuit and a soma circuit. The output of the soma circuit is applied to the input of an axon circuit 404. Each of the digital neuron present in the array of artificial digital neurons 400 consists of the axon circuit 404. The axon circuit 404 emits one or more output spikes governed by the strength of the soma output value. From the axon circuit 404, events are generated for the next layer of digital neurons, or to output neurons in case the last neuron layer is an output layer, via a status output bus 406. The output spike of the axon circuit 404 is transmitted to the plurality of connected synapses using a proprietary communication protocol in the next layer.

The digital neuron consists of dendrites that receive one or more synaptic inputs and the axon that shapes an output spike signal. Neurons are connected through synapse that receives feedback from the post-synaptic neuron which causes the efficacy of the connection to be modified. The output of the plurality of synapses is integrated by the dendrite circuit and the soma circuit. The output of the soma circuit is applied to the input of the axon circuit. The axon circuit emits one or more output spikes governed by the soma output value. The output spike of the axon circuit is transmitted to the plurality of synapses in the next layer. Autonomous learning occurs when a synaptic strength value within the system is increased or decreased as a result of a temporal difference of an input spike temporally related to the soma feedback output spike. Each of the first spiking neural network 302 and the second spiking neural network 304 comprises a plurality of digital artificial neurons connected to each other through digital synapses connected as a hierarchical artificial neural network. Further, each of the plurality of digital artificial neuron comprises of binary logic gates.

Figure 5:
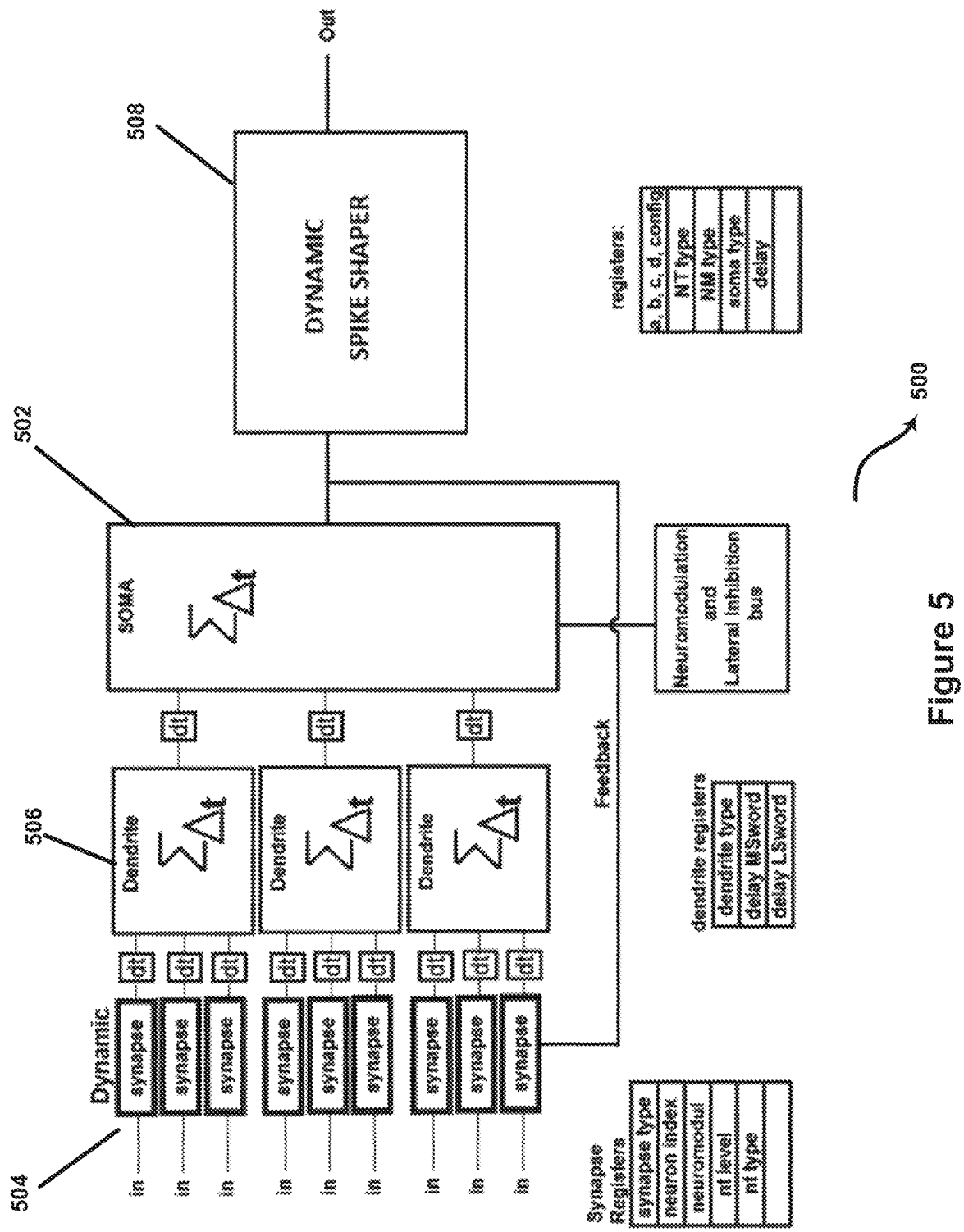
FIG. 5 is a block diagram showing components of an artificial neuron present in the artificial neuron array, in accordance with an embodiment of the present invention.

FIG. 5 is a block diagram showing components of an artificial neuron present in the artificial neuron array, in accordance with an embodiment of the present invention. The artificial neuron 500 comprises a soma circuit 502, a plurality of synapse circuits 504 designated within an axon circuit 508. There is no theoretical limitation to the number of synapses that can be connected to the soma circuit 502. An integration circuit is constructed from individual adder circuits that are incorporated within the synapse circuit 504 and connected to form an array adder circuit 506. The number of connected synapse circuits 504 is therefore flexible. The integrated sum is input to the soma circuit 502. Soma control constitutes a circuit that increases the threshold potential for a period after the soma has fired. The output of the soma circuit 502 is applied to the input of the axon circuit 508. The axon circuit 508 emits one or more output spikes governed by the strength of the soma output value.

Figure 6:
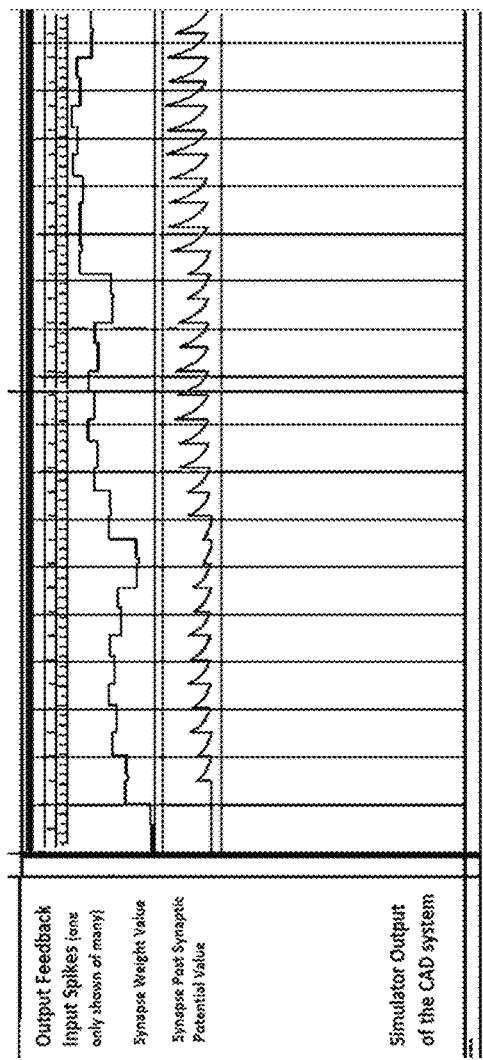
FIG. 6 shows a graph output representing CAD system synapse PSP behavior and STDP variation used by the first spiking neural network, in accordance with an embodiment of the present invention.

FIG. 6 shows a graph output representing CAD system synapse PSP behavior and STDP variation used by the first spiking neural network, in accordance with an embodiment of the present invention. The graph output 600 shows behavior of a synapse Post-Synaptic Potential (PSP) and an STDP weight variation. PSP is a temporary change in the electric polarization of digital neuron. The postsynaptic potential can lead to the firing of a new spike impulse.

Figure 7:
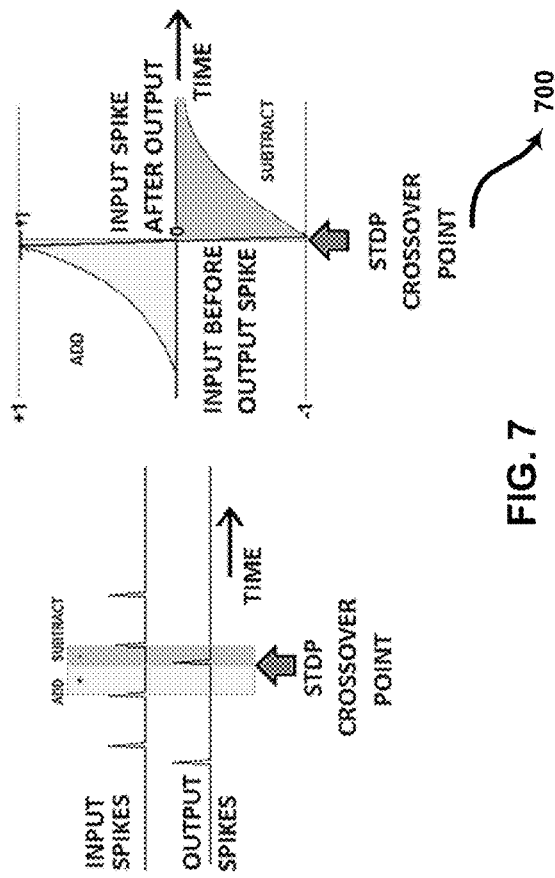
FIG. 7 shows spike timing dependent plasticity (STDP) implemented by the first spiking neural network in the system, in accordance with an embodiment of the present invention.

FIG. 7 shows spike timing dependent plasticity implemented by the first spiking neural network in the system, in accordance with an embodiment of the present invention. The process of spike timing dependent plasticity 700 is used by the first spiking neural network 302 to autonomously learn for pattern feature extraction and recognition. Feedback of output pulses to synaptic inputs drives a process known as synaptic time dependent plasticity, commonly abbreviated as STDP, whereby the strength of a synapse is modified depending on the temporal difference of input to output pulses. This process is responsible for learning and memory functionalities in the first spiking neural network 302 of the system 300.

In an embodiment, all processes are performed in parallel in a digital hardware. Such as, a synapse circuit performs the functions that are known to occur in a biological synapse, namely the temporal integration of input spikes, modification of the 'weight' value stored in the synapse by the STDP circuit, decay of a post-synaptic potential value, and the increase of this post-synaptic potential value when a spike is received. The dendrite circuit performs a function that is known to occur in biological dendrites, namely the integration of the post-synaptic potential value output by a plurality of synapses. The soma circuit performs a function that is known to occur in biological neurons, namely the integration of values produced by two or more dendrite circuits. The axon circuit is also performing a function known to occur in biological neurons, namely the creation of one or more spikes, in which each spike is a short burst of electrical energy also known as a pulse.

Each of the first spiking neural network 302 and the second spiking neural network 304 is composed of the first plurality of artificial neurons that are connected to other artificial neurons via a second plurality of configurable synapse circuits. Both the connectivity and the strength of synapses are configurable through digital registers that can be accessed externally. The weight value stored in the synapse changes over time through application of the STDP learning rule which is implemented in digital hardware.

Figure 8:
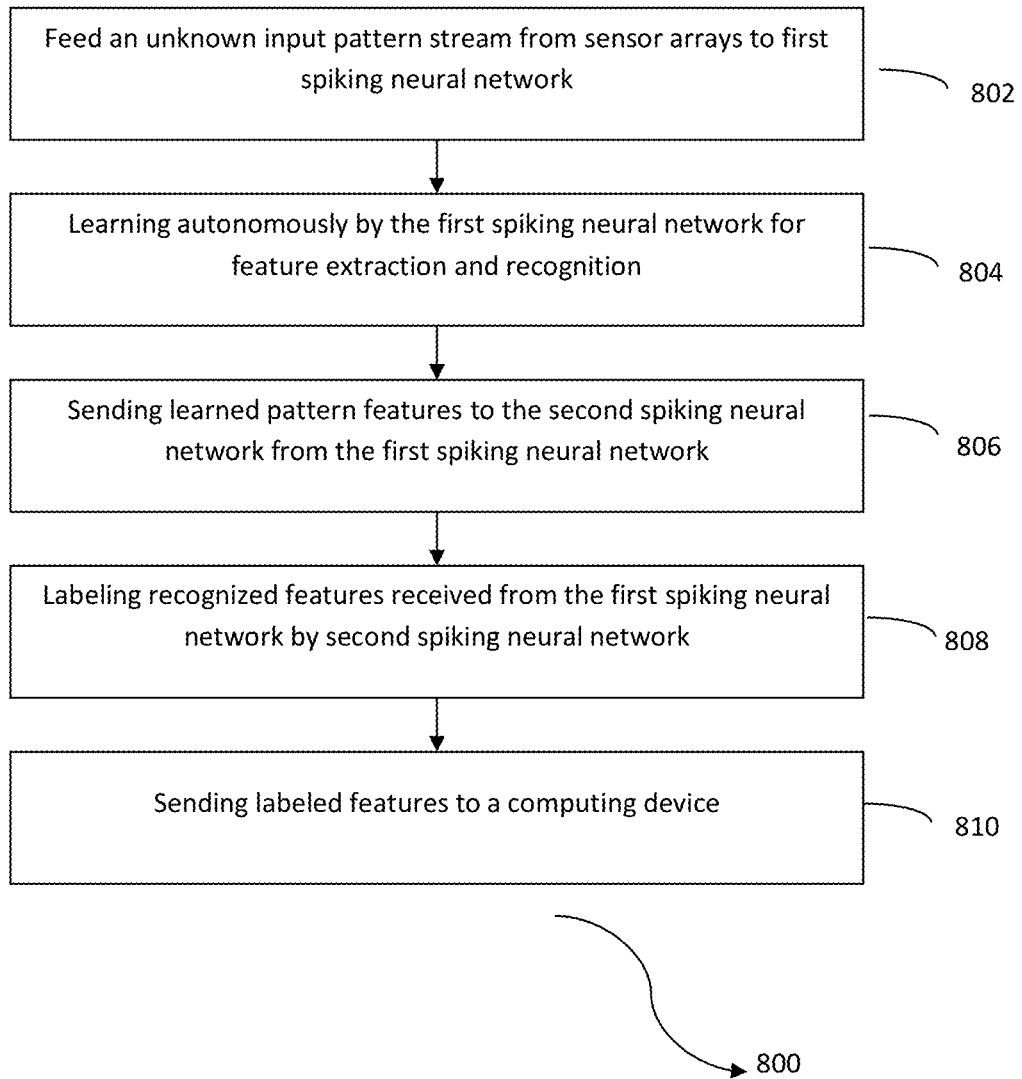
FIG. 8 illustrates a flowchart showing a method of autonomous learning and output labeling by a system of neural networks, in accordance with an embodiment of the present invention.

FIG. 8 illustrates a flowchart showing a method of autonomous learning and output labeling by a system of neural networks, in accordance with an embodiment of the present invention. The method 800 comprises feeding an input data stream containing unknown patterns from a variety of sensors 202 to the first spiking neural network 302, at step 802. The first spiking neural network 302 comprises a plurality of digital artificial spiking neurons; each of the plurality of digital spiking neurons comprises of binary logic gates and is interconnected to other artificial spiking neurons through dynamic artificial synapses. The first spiking neural network 302 is connected by means of dynamic sensory neurons 204 to the variety of sensors 202 that provide a defined, but unlabeled pattern stream. In some instances, the sensor array 202 is connected directly to the first spiking neural network 302, where the sensor 202 provides a stream of temporal and spatially distributed spikes, comprising of defined but unlabeled pattern streams.

At step 804, the first spiking neural network 302 learns autonomously for pattern feature extraction and recognition. The first spiking neural network 302 is configured to learn autonomously by applying the input data stream 308, by means of a learning method known as synaptic time dependent plasticity, otherwise known as STDP, and lateral inhibition, thereby creating a knowledge domain comprised of a plurality of weights representing learned and recognized features arising in the input data stream. At step 806, the information consisting of learned pattern features is then passed to the second spiking neural network 304 that comprises a monitoring means.

At step 808, the second spiking neural network 304 labels the recognized features received from the first spiking neural network 302. The second spiking neural network 304 is trained to identify output from the first spiking neural network 302 that meets the predetermined criteria. The second spiking neural network 304 acts as a labeling network that produces input-output map within a predetermined knowledge domain. Therefore, output of the second spiking neural network 304 is a labeled data. At step 810, the labeled data or the labeled features are sent to a computing device, such as a central processing unit (CPU) for post processing.

In an embodiment of the present invention, the system can be applied to autonomously extract features from a large variety of data sources. Examples of such data sources can be defined as streamed data received from the Internet, such as financial information exchange (FIX) market data. Another example is defined as the data that originates from various analog or digital sensors, such as vision sensors, digital microphones, tactile pressure sensors, chemical sensors and other types of sensors or data sources. The data may be received in the form of binary spikes, or as multi-bit binary variables that are converted to spikes by means of digital sensory neurons. The data is received in real-time but may also be in the form of a recording. Once the system has learned features present in the input data stream, the system is capable of recognizing these features. The learned properties of the digital neurons and synapses can be stored externally or locally in a library file. The library file can be uploaded by other similarly configured systems in order to instantaneously assimilate the learned features.

The invention claimed is:

1. A system for autonomous feature extraction, the system comprising:
    feedforward digital hardware-only circuitry, the feedforward digital hardware-only circuitry including a hierarchical arrangement of a first artificial spiking neural network and a second artificial spiking neural network,
    wherein the first artificial spiking neural network comprises a first plurality of digital neurons connected to other digital neurons via a plurality of configurable synapse circuits which are configurable using digital registers that are externally accessible, the first artificial spiking neural network autonomously learns to recognize a repeating pattern in an input stream through spike timing dependent plasticity (STDP) and lateral inhibition of the other digital neurons and the second artificial spiking neural network is trained to interpret and label the repeating pattern recognized by the first artificial spiking neural network,
    wherein the feedforward digital hardware-only circuitry is configured to autonomously, learn, interpret, and label deterministically.

2. The system of claim 1, wherein the first artificial spiking neural network autonomously learns any repeating pattern within 3 to 7 repetitions through the STDP and lateral inhibition, wherein one of the first plurality of digital neurons laterally inhibits all other neurons of the first plurality of digital neurons such that the all other neurons learn different features to the one of the first plurality of digital neurons.

3. The system of claim 1, wherein the first artificial spiking neural network and the second artificial spiking neural network comprise either a single layered spiking neural network or a multilayered spiking neural network.

4. The system of claim 1, wherein the labeling, of the repeating pattern by the second artificial spiking neural network is carried out by mapping learned features into output labels within a predetermined knowledge domain.

5. The system of claim 1, further comprising an input unit having a network of artificial sensory neurons connected to the first artificial spiking neural network, wherein the input unit converts data captured in the form of images, characters or values by a sensor array into temporally and spatially distributed spikes.

6. The system of claim 5, wherein the sensor array comprises a plurality of sensors for capturing data of interest and generating the input stream.

7. The system of claim 1, wherein the first artificial spiking neural network and the second artificial spiking neural network comprise a plurality of digital neuron circuits interconnected by a plurality of synapse circuits.

8. The system of claim 1, wherein the first artificial spiking neural network autonomously learns by means of the (STDP) and lateral inhibition to create a predetermined knowledge domain comprising of a plurality of weights representing learned features in the input stream.

9. The system of claim 1, wherein the second artificial spiking neural network is configured to function in a supervised manner and is trained to produce input/output maps within a predetermined knowledge domain.

10. The system of claim 1, wherein the second artificial spiking neural network comprises a monitoring, means to identify outputs that meet some predefined criteria.

11. The system of claim 1, wherein the second artificial spiking neural network transmits output labels to a computing device for post processing.

12. The system of claim 6, wherein the plurality of sensors include at least one of an analog sensor, a digital sensor, a vision sensor, a digital microphone, a tactile pressure sensor, a chemical sensor, or a sensor that is receptive to signals that are outside of human perception.

13. A method for autonomously extracting features in an artificial spiking neural network system, the method comprising:
    feeding an input pattern stream from a sensor to a first artificial spiking neural network;
    learning, autonomously, by the first artificial spiking neural network through spike timing dependent plasticity (STDP) and lateral inhibition to recognize repeating patterns in the input pattern stream and subsequently perform feature extraction;
    sending spikes representing recognized patterns to a second artificial spiking neural network from the first artificial spiking neural network;
    labeling the recognized patterns by the second artificial spiking neural network, wherein the recognized patterns represent features learned by the first artificial spiking neural network and received from the first artificial spiking neural network; and
    sending labeled data representing the recognized patterns to a computing device for post processing,
    wherein the feeding, the sending the spikes, the labeling the recognized patterns, and the sending the labeled data are performed by feedforward digital hardware-only circuitry, deterministically, the feedforward digital hardware-only circuitry including the first artificial spiking neural network and the second artificial spiking neural network,
    wherein the first artificial spiking neural network comprises a first plurality of digital neurons connected to other digital neurons via a plurality of configurable synapse circuits which are configurable using digital registers that are externally accessible.

14. The method of claim 13, wherein the first artificial spiking neural network and the second artificial spiking neural network comprise a plurality of digital neuron circuits interconnected by a plurality of synapse circuits.

15. The method of claim 13, wherein the first artificial spiking neural network and the second artificial spiking neural network comprise either a single layer of digital neuron circuits or a multilayer of digital neuron circuits.

16. The method of claim 13, wherein the first artificial spiking neural network autonomously, learns by means of the STDP and lateral inhibition to create a predetermined knowledge domain comprising of a plurality of weights representing the learned features in the input pattern stream.

17. The method of claim 13, wherein the second artificial spiking neural network is configured to function in a supervised manner and is trained to produce input/output maps within a predetermined knowledge domain.

18. The method of claim 13, wherein the second artificial spiking neural network comprises a monitoring means to identify outputs that meet some predefined criteria.

19. The method of claim 13, wherein the second artificial spiking neural network transmits output labels to a computing device for post processing.

20. The sytem of claim 1, wherein connectivity and strength of the plurality of configurable synapse circuits are configurable using digital registers that are externally accessed.

21. The system of claim 1, wherein the first plurality of digital neurons is fabricated using binary logic gates.

* * * * *